United States Patent [19]
Allen

[11] 3,780,886
[45] Dec. 25, 1973

[54] FEEDING OF TOBACCO AND OTHER MATERIALS

[75] Inventor: Edward James Allen, Southampton, England

[73] Assignee: W. H. Dickinson Engineering Limited

[22] Filed: Feb. 14, 1972

[21] Appl. No.: 226,164

[52] U.S. Cl. ........................................... 214/17 CA
[51] Int. Cl. ............................................. B65g 65/30
[58] Field of Search ................... 198/44, 47, 52–54, 198/56–57; 214/17 C, 17 CA

[56] References Cited
UNITED STATES PATENTS
3,125,231   3/1964   Mortland ........................ 198/57 X
3,528,538   9/1970   Quester ............................. 198/57

Primary Examiner—Edward A. Sroka
Attorney—Paul M. Craig, Jr. et al.

[57] ABSTRACT

Apparatus for feeding especially tobacco comprises a silo which has a floor formed by a conveyor for carrying a mass of material in the silo towards a discharge end of the silo, and includes an infeed device which is arranged to move continuously along the conveyor in a controlled oscillatory motion having a mean position which, while the conveyor is stationary, moves from one end of the silo towards the other.

13 Claims, 5 Drawing Figures

FEEDING OF TOBACCO AND OTHER MATERIALS

This invention is particularly concerned with feeding tobacco, either in leaf form or after cutting, but it could be used for feeding other solid material.

According to one aspect of this invention a material feeding apparatus comprises a silo which has a floor formed by a conveyor for carrying a mass of material in the silo towards one end of the silo, and including an infeed device which is arranged to move continuously in a controlled oscillatory motion having a mean position which, while the conveyor is stationary, moves from one end of the silo towards the other so as to fill the silo to a substantially constant depth, in a series of oblique layers extending substantially from the top of the mass of material to the bottom. The mean position of the infeed device is preferably moved along the conveyor under the control of a sensing device which is carried by the infeed device and is arranged to reverse the movement of the infeed device whenever the sensing device reaches the position up to which the silo has been filled to the required full depth.

The term "silo" in this context is intended to include in particular a device which can be used for storing a substantial volume of material; in other words the silo may from time to time be filled (with the conveyor remaining stationary) and later emptied. Alternatively a silo according to this invention may be used as a buffer reservoir which takes in or makes up the difference between the rates at which material is delivered to and demanded from the silo; in this case the conveyor would move continuously or intermittently while material is being fed into the silo by the infeed device.

In a preferred arrangement, whenever the infeed device reaches the full-depth position of the material in the silo, the sensing device (for example a photocell or proximity switch) reverses the direction of traverse of the infeed device and at the same time operates a timer which reverses the infeed device (to make it move again towards the material in the silo) after a predetermined interval of time. Alternatively there may be say two sensing devices mounted on the infeed device at longitudinally spaced positions along the silo and so arranged that the traverse of the infeed device reverses whenever one of the sensing devices reaches the end of the full-depth tobacco in the silo. For example, there may be one photocell which is obscured most of the time by the full-depth tobacco and another which is most of the time not obscured; the first would reverse the infeed device when the obscuring by tobacco stops, and the second would reverse the infeed device (in the opposite sense) when it becomes obscured by tobacco, the spacing between the two photocells being substantial so that the infeed device performs long traverses so as to build up the tobacco bulk in the silo in the form of layers extending obliquely substantially from the top of the bulk of tobacco to the bottom.

By way of example apparatus embodying the invention will now be described. In the drawings.

Figure 1:
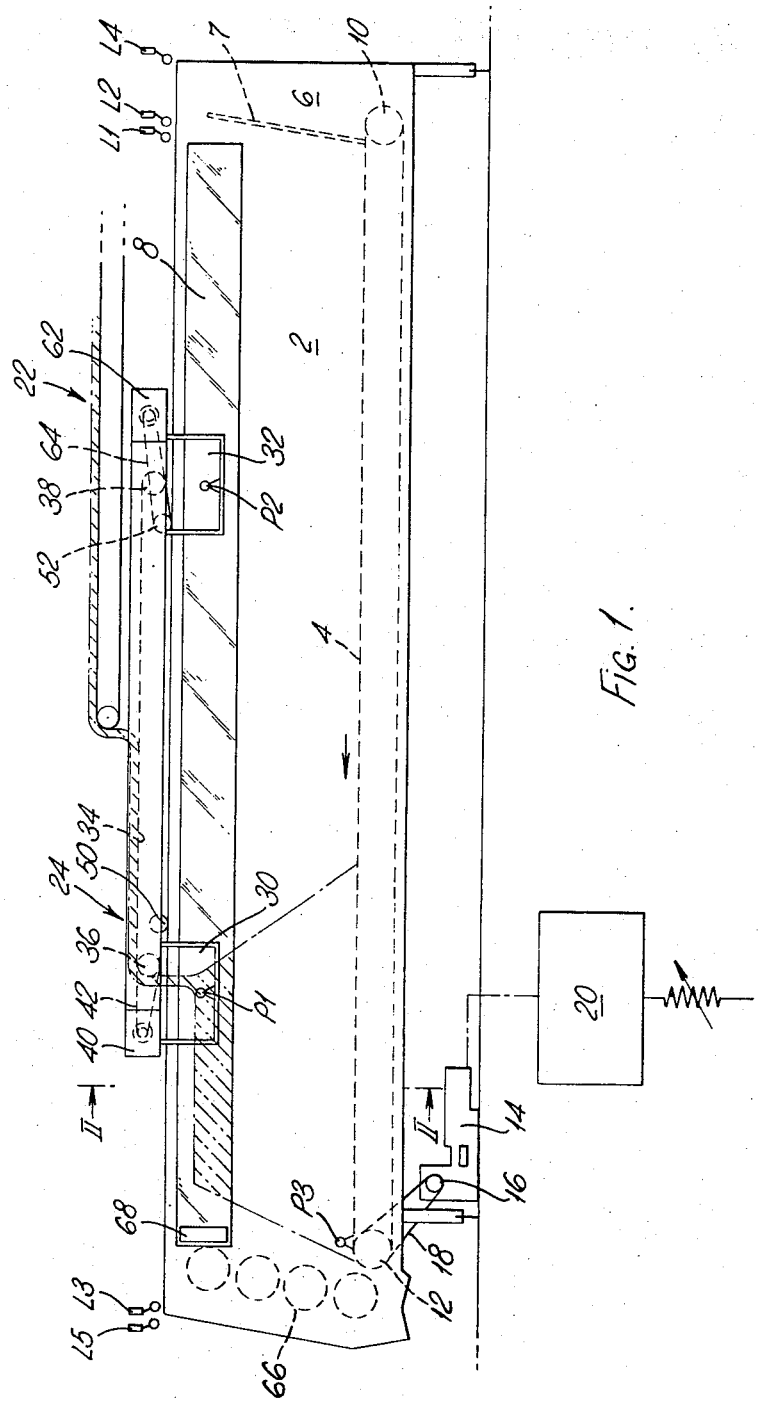
FIG. 1 is a side view, partly in section, of apparatus according to the invention for feeding cut tobacco into a silo.
Figure 2:
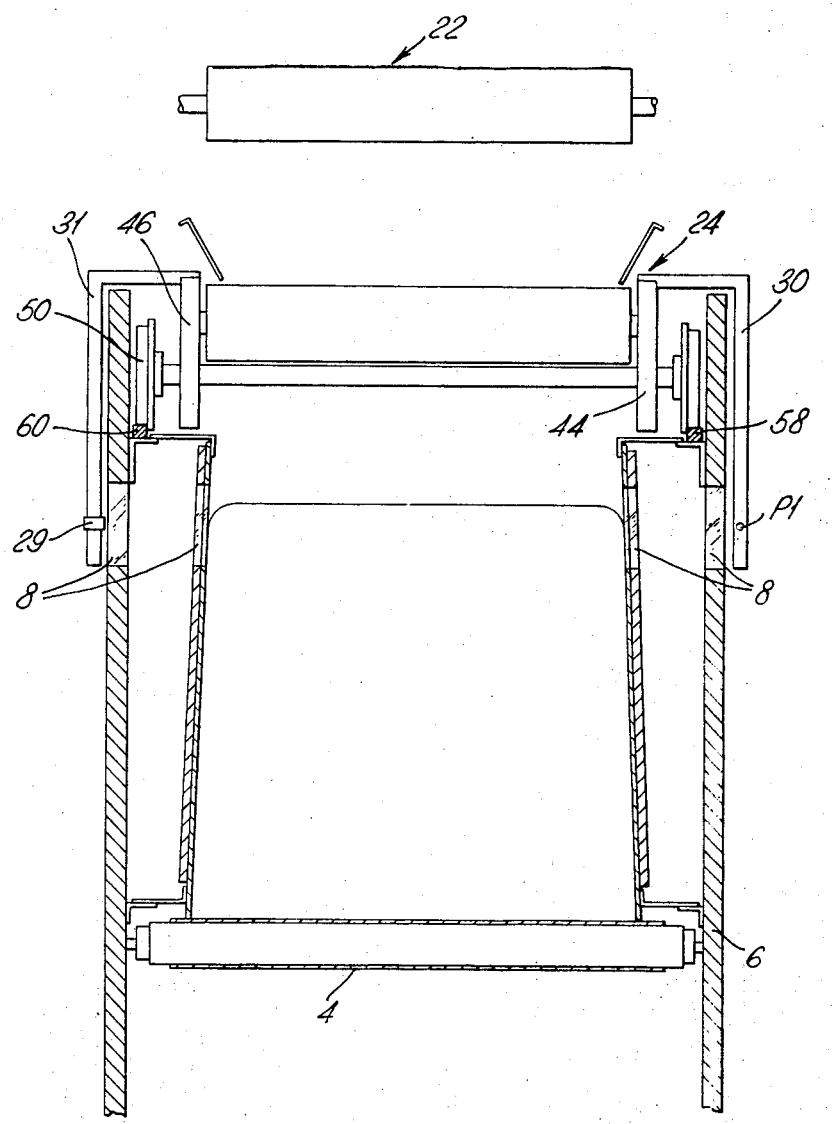
FIG. 2 is a section on the line II—II of FIG. 1 from which some parts have been omitted for clairity.

Referring first to FIGS. 1 and 2, a silo generally designated 2 has a base defined by the top run of a conveyor band 4, with side walls 6, and a back wall 7. The side walls have transparent windows 8 in them. The silo band 4 runs round two pulleys 10 and 12. In the example shown the pulley 10 is an idler pulley and the pulley 12 is driven by a motor 14 through a driving pulley 16 and a belt 18. The motor 14 has a speed controller shown diagrammatically and referenced 20 in the drawings.

Tobacco is fed into the silo from a feed conveyor 22 via an infeed device in the form of a follow-up conveyor (generally referenced 24). Both the feed conveyor 22 and the follow-up conveyor 24 may extend across the full width of the silo (see FIG. 2); alternatively the feed conveyor 22 may be narrower and may be pivoted about a vertical axis so that it can swing from side to side to spread the tobacco across the whole width of the follow-up conveyor.

Photocells P1 and P2 are mounted upon supports 30 and 32 respectively, the supports being attached to the follow-up conveyor 24 in such a way that the photocells are adjacent to one of the windows 8. A light source 29 is shown in FIG. 2 corresponding to the photocell P1 and mounted on a support 31 similar to the supports 30 and 32. A similar light source is also provided for the photocell P2. A further photocell P3 is provided at the front bottom corner of the silo to signal when the silo is empty. The follow-up conveyor 24 has a band 34 with a driving roller 36 and an idler roller 38. The drive roller 36 is driven from a motor 40 by a belt 42. The rollers 36 and 38 are mounted on shafts carried by a structure including side members 44 and 46. This structure carries two pairs of wheels 50 and 52 which run on rails 58 and 60, thus supporting the follow-up conveyor. The wheels 52 are driven by a traverse drive motor 62 via a belt drive 64 to vary positions along the silo at which tobacco is fed into the silo from the end of the follow-up conveyor.

Doffers 66 may be provided to assist in removing tobacco from the silo. The tobacco may, for example, be fed downwards to a weighing conveyor (not shown) which controls the silo band controller 20. Alternatively an obliquely rising band with spikes or slats could be provided to deliver the tobacco from the silo, in which case the motor 14 driving the silo band could be switched on and off under the control of a photoelectric device to maintain a tobacco layer of substantially constant thicknesss on the rising band.

Figure 3:
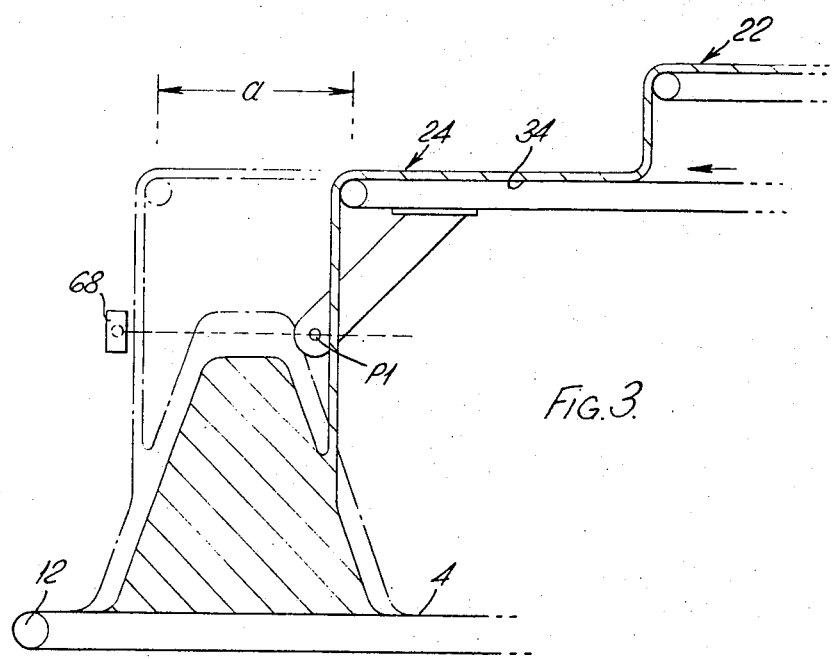
FIG. 3 shows diagrammatically the building up of tobacco in the silo of FIG. 1.

FIG. 3 shows how the follow-up conveyor oscillates forwards and backwards, starting next to the front end of the silo, to feed successive layers of tobacco over a predetermined silo length so as to build up an initial mound of tobacco to the required depth. With the band 34 running forwards (as shown) the follow-up conveyor is traversed forwards until the photocell P1 is obscured by a masking plate 68 in the window 8; in other words a beam of light directed across the silo and towards the photocell P1 is interrupted. This actuates a control cicuit (not shown) which reverses the traverse drive to the follow-up conveyor while the band 34 continues to feed forwards. The follow-up conveyor then traverses back for a predetermined distance as set by an adjustable timer in the control circuit. The follow-up conveyor is thus traversed back while all the time feeding tobacco from its front end into the silo (see FIG. 3). For example, if it is desired to have oscillations 3 feet long, the traverse drive could be set at 15 feet per minute and the timer set for 12 second traverse.

Figure 4:
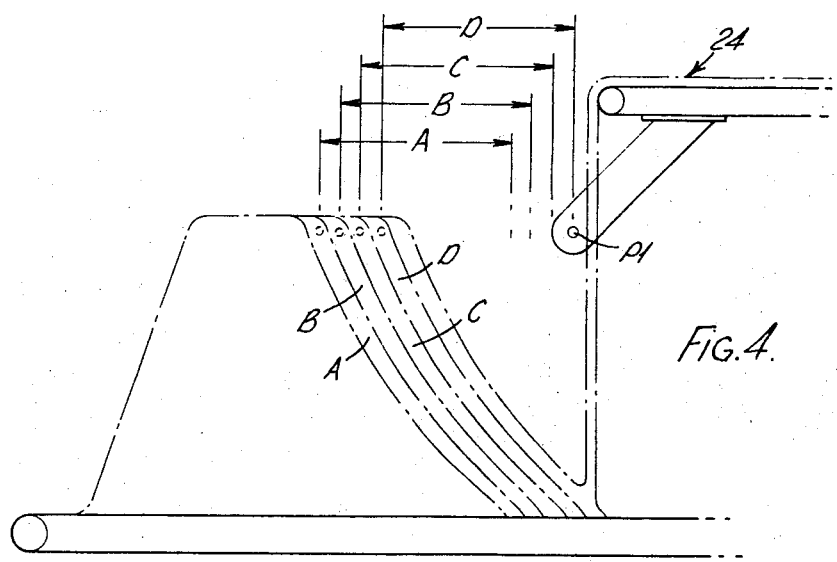
FIG. 4 shows diagrammatically the motion of the follow-up conveyor and building up of tobacco in a silo.
Figure 5:
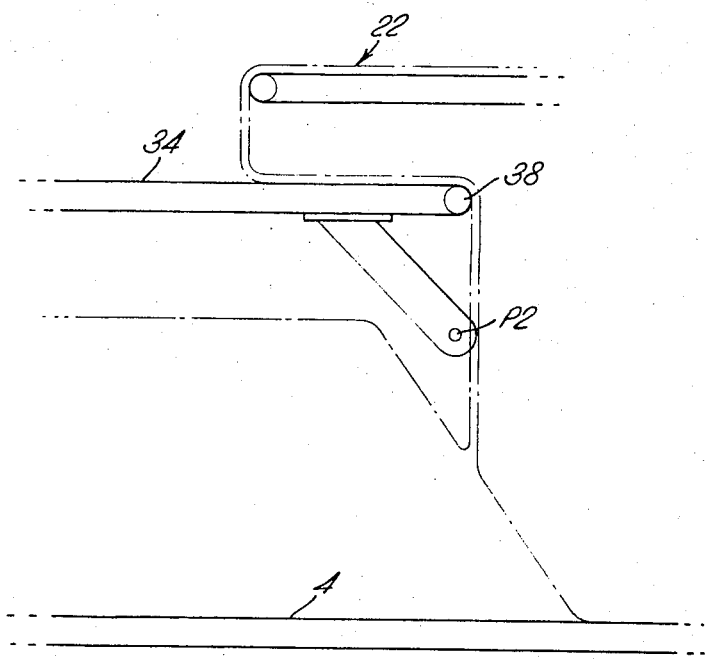
FIG. 5 is a diagrammatic side view showing the filling of the rear half of the silo.

The follow-up conveyor is then traversed forwards again until the photocell P1 is once more obscured, and the traverse drive reversed. When feeding tobacco into an empty silo the follow-up conveyor oscillates over a length *a* shown in FIG. 3 until the height of the tobacco is such that the photocell P1 is obscured by the tobacco instead of the masking plate 68. When the tobacco is this high then the follow-up conveyor will oscillate in a similar manner behind the position at which the photocell is obscured by tobacco and so the follow-up conveyor gradually works back along the silo, as shown in FIG. 4, in which successive strokes of the follow-up conveyor are shown by the letters A to D and produce corresponding successive layers as shown extending obliquely substantially from the top of the mass of tobacco to the bottom.

When the silo is half full, the follow-up conveyor operates a limit switch L1 (FIG. 1). This stops the drive to the band 34 and switches the photocell P2 into the control circuit instead of P1. With the photocell P2 now acting as the controlling photocell, the follow-up conveyor traverses forward until this photocell is obscured by the tobacco in the silo. This starts the band 34 running backwards so as to feed tobacco from the right hand end of the follow-up conveyor, starts the timer and reverses the traverse drive, as before. The follow-up conveyor then continues to oscillate forwards and backwards in a manner similar to when it was filling the front half of the silo until the silo is full, when the follow-up conveyor operates a limit switch L2 and stops the tobacco feed into the silo. A photocell (not shown) can be situated near the rear of the silo to give warning of the nearly full condition.

If tobacco is discharged from the silo while tobacco is being fed into the silo then the oscillations of the follow-up conveyor take account of the movement of the body of tobacco on the silo band. The mean position of the follow-up conveyor would move more slowly to the right and could stop moving if the tobacco is fed from the silo at the same rate as it is delivered by the follow-up conveyor, or even more to the left if the feed-out rate exceeds the feed-in rate.

If tobacco is being discharged from the silo at a faster rate than it is being fed to the silo, the oscillations of the follow-up conveyor will progress forward and follow the tobacco in the silo. If this situation occurs when the follow-up conveyor is feeding tobacco into the rear half of the silo, under the control of the photocell P2, then the oscillations will follow the tobacco in the silo until the follow-up conveyor operates a limit switch L3. This switches the photocell P1 into the control circuit instead of P2 and the follow-up conveyor therefore traverses backwards until the photocell P1 is no longer obscured by tobacco in the silo, when the follow-up conveyor will oscillate and feed tobacco from its front end as previously described. The band 34 may be started running forwards immediately as a result of the operation of the limit switch L3, or else this may be arranged to happen only when the photocell P1 is unobscured and oscillations commence.

Limit switches L4 and L5 act as safety overrun switches and switch off the infeed of tobacco, the motor 62 and the drive to the band 34 if limit switch L2 or L3 fails to work and the follow-up conveyor moves too far to the right or left as the case may be.

Instead of the photocells P1 and P2, other means of detecting the position of the full-depth tobacco in the silo could be used; e.g. proximity switches or switches operated by pendulums, hanging down from the follow-up conveyor into the silo so as to contact the tobacco.

An alternative to the feed-in described above would be to have a follow-up conveyor at least as long as the silo with the band 34 run continuously forward and always under the control of the photocell P1. The left-hand end of the feed conveyor 22 would then be above the wall 7 of the silo. This would obviate the need to reverse the band 34 and switch to a photocell P2 when the silo is half full as described above; but would require clearance behind the silo at least equal to the length of the follow-up conveyor.

I claim:

1. A method of feeding material such as tobacco to a predetermined height into a silo which has a floor formed by a conveyor for carrying material in the silo towards a discharge end of the silo, comprising feeding the material into the silo in a continuous series of oscillations along the conveyor, each oscillation covering part of the length of the silo, and the mean position of successive oscillations being moved along the silo, so that the mass of material in the silo is built up to a predetermined height in a series of oblique layers extending substantially from the top of the mass to the bottom.

2. A method according to claim 1 in which the oscillations each comprise a movement towards the discharge end of the silo, ending where the mass of tobacco in the silo is at the predetermined height, and a movement in the opposite direction through a predetermined distance.

3. A material feeding apparatus comprising a silo having a floor formed by a conveyor and means to drive said conveyor to carry a mass of material in the silo towards a discharge end of the silo, an infeed device and means for driving said infeed device continuously along said conveyor in a controlled oscillatory motion having a mean position which moves progressively along the silo relative to the conveyor so as to fill the silo to a substantially constant depth in a series of oblique layers extending substantially from the top of the mass of material to the bottom.

4. A material feeding apparatus according to claim 3 wherein said conveyor drive means and said means for driving said infeed device are controlled to operate at the same time so that said silo serves as a buffer store.

5. A material feeding apparatus according to claim 3 wherein said infeed device includes a follow-up conveyor and means to drive said follow-up conveyor continuously and unidirectionally towards said discharge end of said silo while said infeed device as a whole is oscillating along said silo to build up a mass of material along at least part of said silo.

6. A material feeding apparatus comprising a silo which has a floor formed by a conveyor for carrying a mass of material in the silo towards a discharge end of the silo, and including an infeed device which is arranged to move continuously along the conveyor in a controlled oscillatory motion having a mean position which while the conveyor is stationary, moves from one end of the silo towards the other so as to fill the silo to a substantially constant depth in a series of oblique layers extending substantially from the top of the mass of material to the bottom, the mean position of the infeed device being moved along the conveyor under the control of a sensing device which is carried by the infeed device and is arranged to reverse the movement of the infeed device whenever the sensing device reaches the position up to which the silo has been filled to the required full depth.

7. Apparatus according to claim 6 in which the sensing device comprises a photo-electric cell which is carried by the infeed device on one side of the silo and towards which a light beam is directed by a source of light carried by the infeed device on the other side of the silo.

8. Apparatus according to claim 6 in which the infeed device, during each oscillation, travels away from the discharge end of the silo, at a predetermined speed, and for a predetermined time set by a timing device.

9. Apparatus according to claim 6 in which the infeed device is controlled by two sensing devices, one of which initiates movement of the infeed device away from the discharge end when the infeed device reaches the portion of the conveyor carrying the required full depth of material, and the other of which initiates movement of the infeed device towards the discharge end when the infeed device is a predetermined distance behind said portion.

10. A material feeding aparatus comprising a silo which has a floor formed by a conveyor for carrying a mass of material in the silo towards a discharge end of the silo, and including an infeed device which is arranged to move continuously along the conveyor in a controlled oscillatory motion having a mean position which while the conveyor is stationary, moves from one end of the silo towards the other so as to fill the silo to a substantially constant depth in a series of oblique layers extending substantially from the top of the mass of material to the bottom, the infeed device being substantially half the length of the silo and has a sensing device associated with each end; and in which the infeed device is arranged to fill the front half of the silo, adjacent to the discharge end, by feeding material from the front end of the infeed device under the control of the corresponding sensing device, and to fill the rear half of the silo by feeding material from the rear end of the infeed device under the control of the sensing device at that end of the infeed device.

11. Material feeding apparatus comprising a silo having a floor formed by a conveyor for carying a mass of material of predetermined height towards a discharge end of the silo; an infeed device for feeding material downwards into the silo at various positions along the silo; a sensing device which is carried by the infeed device and signals whenever the infeed device, during movement towards the discharge end of the silo, reaches the position at which the mass of material is at the predetermined height; means for driving the infeed device towards and away from the discharge end of the silo at a predetermined speed; and a control system comprising means for reversing the direction of motion of the infeed device upon receipt of a signal from the sensing device, and a timing device which reverses the direction of movement of the infeed device a predetermined interval of time after receipt of the signal from the sensing device, whereby the infeed device oscillates continuously towards and away from the discharge end of the silo, each movement away from the discharge end being through a predetermined distance as set by the timing device.

12. A material feeding apparatus comprising a silo having a floor formed by a conveyor and means to drive said conveyor to carry a mass of material in the silo towards a discharge end of said silo, an infeed device and means for driving said infeed device continuously along said conveyor in a controlled oscillatory motion having a mean position which moves progressively along said silo relative to the conveyor and an oscillation stroke which is less than half the length of said conveyor, so as to fill said silo to a substantially constant depth in a series of oblique layers extending substantially from the top of the mass of material to the bottom, and sensing means carried by said infeed device for reversing the movement of said infeed device upon detection that said infeed device has reached a position at which said silo has been filled to the required full depth, to thereby move the means position of said infeed device along said conveyor.

13. A material feeding apparatus according to claim 12, further including additional sensing means for initiating movement of said infeed device towards said discharge end of said silo when said infeed device is a predetermined distance behind said position at which said silo has been filled to the required full depth, said sensing means serving to initiate movement of said infeed device away from the discharge end of said conveyor.

* * * * *

UNITED STATES PATENT OFFICE
CERTIFICATE OF CORRECTION

Patent No. 3,780,886      Dated December 25, 1973

Inventor(s) Edward James Allen

It is certified that error appears in the above-identified patent and that said Letters Patent are hereby corrected as shown below:

Title page, insert the following:

[30]    Foreign Application Priority Data

February 18, 1971    Great Britain    4954/71

Signed and sealed this 18th day of June 1974.

(SEAL)
Attest:

EDWARD M. FLETCHER, JR.          C. MARSHALL DANN
Attesting Officer               Commissioner of Patents